Aug. 30, 1938.  S. M. EDISON  2,128,695
CORN PAD
Filed March 22, 1937

Inventor:
Sylvan M. Edison
By: Stevens & Batchelor
Atty's.

Patented Aug. 30, 1938

2,128,695

UNITED STATES PATENT OFFICE 2,128,695

CORN PAD

Sylvan M. Edison, Chicago, Ill., assignor to Salem N. Baskin, Chicago, Ill.

Application March 22, 1937, Serial No. 132,429

1 Claim. (Cl. 128—153)

My invention relates to corn pads, and more particularly to that type which surrounds or encircles the corn and is of a height to protect the corn from pressure by the shoe, and my main object is to provide a pad which is adjustable to the size of the corn.

A further object of the invention is to provide a corn pad which closes in on the pronounced or protuberant portion of the corn whereby to confine the same within the pad and isolate it from the surrounding area leading to such portion.

Another object of the invention is to provide a pad which serves as a receptacle for the pronounced or hard portion of the corn and for medicaments applicable thereto.

An additional object of the invention is to provide a corn pad which makes it possible to confine the treatment of the corn to the pronounced or hard portion thereof and keep the medicament from reaching or affecting the surrounding area.

An important object of the invention is to construct the novel corn pad in one piece and in a manner to be inexpensively produced and easily handled.

With the above objects in view, and any others which may suggest themselves from the description to follow, a better understanding of the invention may be had by reference to the accompanying drawing, in which Fig. 1 is a perspective view showing the application of the novel pad to a corn;

The conventional corn pad sold on the market is intended to surround the corn with a wall of sufficient height to relieve the pressure exerted by the upper of the shoe, so that the corn may not receive irritation. The pad does not serve as a remedy or treatment and it is not intended to co-operate with any treatment administered to the corn. Generally, the size of the opening in the pad is of no concern, except that it must be sufficiently large to let the corn rise through it. Thus, where the opening is fairly large, it is not safe to apply a strong medicine upon the center of the corn, as the same may spread or run down upon the surrounding and more tender portion of the skin, imparting injury to the same and causing pain or discomfort. It has therefore been my intention to devise a pad which not only permits the safe application of a medicament to the corn, but actually co-operates to retain the same in the immediate zone for which it is intended confining the treatment to the central or main portion of the corn.

Figure 4:
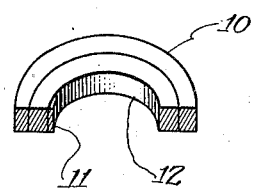
Fig. 4 is a section on the line 4—4 of Fig. 3.

In accordance with the foregoing, specific reference to the drawing indicates the novel pad at 10. The same is in the form of a spiral coil whose end portions taper to a point, as indicated at 11. The pad is of the usual felt or other suitable material, and its turns are of the conventional square or rectangular form, as shown in Fig. 4.

Figure 3:
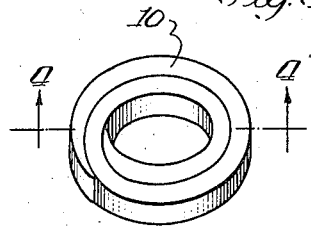
Fig. 3 is a perspective view of the pad as expanded for application over a corn.

When placed on sale or display, the novel corn pad is wound rather close, in order that its central opening 12 may be small enough to fit about a relatively small corn. However, where the corn is larger, it is only necessary to draw the pad out in an unwinding course, whereby to enlarge the opening as shown in Fig. 3. The pad is coated with a dry adhesive on its under side, and when it has been adjusted to size the adhesive is moistened, and the pad pressed in place. It thus forms a wall immediately around the crown or hard part of the corn; and when a corrosive or other strong medicine is applied to the same the pad will retain it from spreading to the surrounding or more tender skin and causing the same to burn or become painful.

Figure 1:
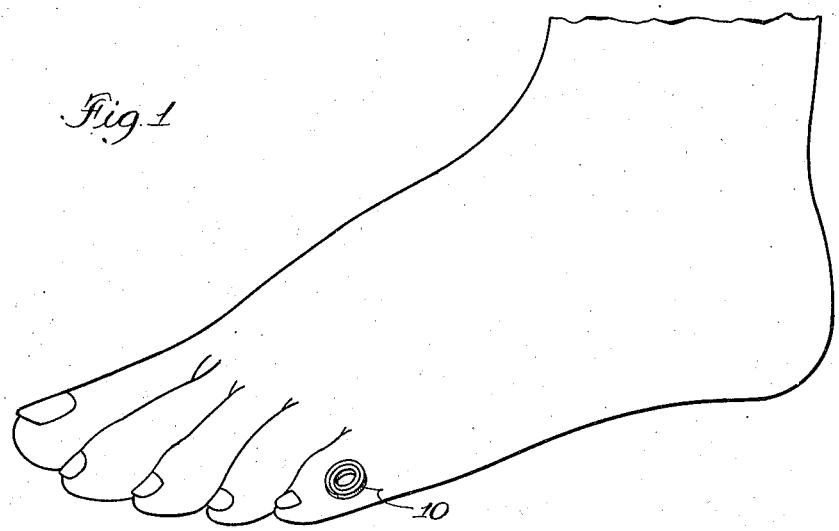
Figure 2:
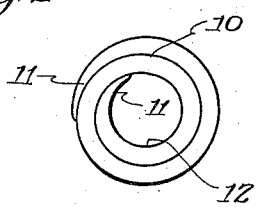
Fig. 2 is an enlarged plan view of the pad as purchased.
Figure 5:
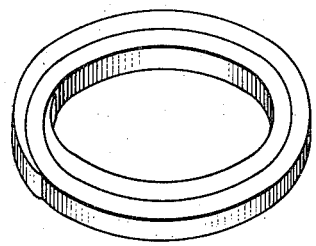
Fig. 5 is a perspective view on an enlarged scale of an oval pad suitable for use over bunions or callouses.

While the novel pad is mainly intended to be made in the circular form and applied as in Fig. 1, it may also be made in larger sizes and of oval form, as shown in Fig. 5, so as to be applicable to bunions and callouses as well. It will be understood that a pad for these purposes may require a further adjustment by hand where it is expanded materially from its original size, but when the pad has been expanded and trained to follow the contour of the bunion or callous and wrapped with its turns close, the application of the pad by means of the adhesive will serve to retain it in the desired form.

It will be evident from the above description that I have provided a pad for corns and like deformities which is of the utmost simplicity yet capable of serving several purposes. Thus, the pad is essentially a spacer or insert in the manner of conventional pads. Second, it is of a nature to be adjustable to corns of various sizes. Third, it can be fixed in any form to which adjusted by direct application with the moistened adhesive, whereby to lie close about the corn to which it is applied and hold its position. Fourth, its turns are close to each other, the innermost one being tapered to form a circular wall about the corn and a seal by means of the adhesive. Fifth, its outer end has a gradual taper so as to render the rim portion of the pad smooth and substantially circular. Finally, the novel pad, because of its wound formation may be made from stock of ribbon form, eliminating waste and enabling the pad to be inexpensively produced.

While I have described the invention along specific lines, various minor changes or refinements may be made in the same from time to time without departing from the scope and spirit of the invention as covered by the appended claim. Thus, one such change may be, for example, to make the pad of cellucotton instead of solid felt, whereby to enable the pad to readily distintegrate by immersion in water, when its removal is desired. The quick access of the water to the adhesive would thus dissolve the same more readily and enable the pad to be removed quickly and without pain or discomfort.

I claim:—

A pad for corns and other similar protuberant growths comprising a spiral of ribbon material and having a central opening in which to receive the growth, the convolutions of which are free to slide along each other to change the size of said central opening whereby to closely surround growths of various sizes, and means to fix the size of the pad when applied.

SYLVAN M. EDISON.